United States Patent
Guo et al.

(10) Patent No.: US 9,143,425 B2
(45) Date of Patent: Sep. 22, 2015

(54) METHOD AND APPARATUS FOR MEASURING PERFORMANCE OF MULTI-SERVICE IN TUNNEL

(71) Applicant: Huawei Technologies Co., Ltd., Shenzhen (CN)

(72) Inventors: Xinchun Guo, Shenzhen (CN); Guoyi Chen, Beijing (CN); Jian Li, Beijing (CN); Wei Cao, Santa Clara, CA (US); Li Xue, Beijing (CN); Jihong Mei, Shenzhen (CN); Zhanbin Wang, Langfang (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 13/691,342

(22) Filed: Nov. 30, 2012

(65) Prior Publication Data
US 2013/0088994 A1   Apr. 11, 2013

Related U.S. Application Data

(63) Continuation of application No. PCT/CN2009/073659, filed on Sep. 1, 2009.

(51) Int. Cl.
*H04L 12/26* (2006.01)
*H04L 12/24* (2006.01)
(Continued)

(52) U.S. Cl.
CPC ............ *H04L 43/50* (2013.01); *H04L 12/4633* (2013.01); *H04L 41/5009* (2013.01);
(Continued)

(58) Field of Classification Search
CPC ...... H04L 41/5009; H04L 43/50; H04L 45/70

USPC ......................................................... 370/252
See application file for complete search history.

(56) References Cited

U.S. PATENT DOCUMENTS 6,868,094 B1   3/2005   Bordonaro et al.
7,092,410 B2   8/2006   Bordonaro et al.
(Continued)

FOREIGN PATENT DOCUMENTS

CN      1783807 A      6/2006
CN    101001115 A      7/2007
(Continued)

OTHER PUBLICATIONS

Search Report issued in corresponding Chinese Patent Application No. 200980151.906.0, dated Feb. 21, 2012.
(Continued)

*Primary Examiner* — Shripal Khajuria
*Assistant Examiner* — Faisal Choudhury
(74) *Attorney, Agent, or Firm* — Brinks Gilson & Lione

(57) ABSTRACT

Embodiments of the present invention provide a method for measuring performance of multi-service in a tunnel, including: receiving a measurement message corresponding to a service packet, where a priority of the measurement message is the same as that of the service packet, and the measurement message includes at least one of the three: a packet loss measurement parameter, a delay measurement parameter, and a variation measurement parameter; and measuring performance of a service in a tunnel according to a measurement parameter in the measurement message. According to the embodiments of the present invention, a problem that performance measurement cannot be performed for different services transmitted in a tunnel in the prior art may be solved.

13 Claims, 4 Drawing Sheets

| Type (PM TLV) | Length |
|---|---|
| Tunnel number ||
| CT7\|CT6\|CT5\|CT4\|CT3\|CT2\|CT1\|CT0   DTI | Reserved |
| Packet loss measurement period of CTx ||
| Delay measurement period of CTx ||

(51) Int. Cl.
*H04L 12/46* (2006.01)
*H04L 12/721* (2013.01)

(52) U.S. Cl.
CPC ........ *H04L43/0829* (2013.01); *H04L 43/0852* (2013.01); *H04L 43/10* (2013.01); *H04L 45/26* (2013.01); *H04L 45/70* (2013.01); *H04L 43/087* (2013.01); *H04L 43/0835* (2013.01); *H04L 43/0858* (2013.01); *H04L 43/0864* (2013.01)

(56) References Cited

U.S. PATENT DOCUMENTS

| | | | |
|---|---|---|---|
| 7,154,858 | B1 | 12/2006 | Zhang et al. |
| 7,792,083 | B2 | 9/2010 | Bordonaro et al. |
| 2005/0094567 | A1* | 5/2005 | Kannan et al. ................ 370/241 |
| 2005/0129059 | A1 | 6/2005 | Jiang et al. .................... 370/466 |
| 2007/0076605 | A1 | 4/2007 | Cidon et al. |
| 2008/0020775 | A1* | 1/2008 | Willars ........................ 455/445 |
| 2008/0171547 | A1 | 7/2008 | Moon et al. .................. 455/436 |
| 2008/0279108 | A1* | 11/2008 | Beziot et al. ................. 370/241 |
| 2008/0318630 | A1* | 12/2008 | Gil ................................ 455/561 |
| 2009/0180485 | A1* | 7/2009 | Bergmann et al. ............ 370/401 |
| 2011/0182231 | A1* | 7/2011 | Wang et al. ................... 370/315 |
| 2012/0014245 | A1* | 1/2012 | Park et al. ..................... 370/216 |

FOREIGN PATENT DOCUMENTS

| | | |
|---|---|---|
| CN | 101039206 A | 9/2007 |
| CN | 101150763 A | 3/2008 |
| CN | 101321092 A | 12/2008 |
| EP | 1995938 A | 11/2008 |

OTHER PUBLICATIONS

Written Opinion of the International Searching Authority issued in corresponding PCT Patent Application No. PCT/CN2009073659, mailed Jun. 3, 2010.

International Search Report issued in corresponding PCT Patent Application No. PCT/CN2009073659, mailed Jun. 3, 2010.

ITU-T, "OAM Functions and Mechanisms for Ethernet based networks" Series Y: Global Information Infrastructure, Internet Protocol Aspects and Next-Generation Networks Y.1731, May 2006.

* cited by examiner

| Type (PL TLV) | Length |
|---|---|
| Tunnel number ||
| CT7 \| CT6 \| CT5 \| CT4 \| CT3 \| CT2 \| CT1 \| CT0 \| DTI | Reserved |
| Packet loss measurement period of CTx ||

FIG. 3

| Type (PM TLV) | Length |
|---|---|
| Tunnel number ||
| CT7 \| CT6 \| CT5 \| CT4 \| CT3 \| CT2 \| CT1 \| CT0 \| DTI | Reserved |
| Packet loss measurement period of CTx ||
| Delay measurement period of CTx ||

FIG. 4

| Type (PM TLV) | Length |
|---|---|
| Tunnel number ||
| Packet loss measurement period ||
| Delay mesurement period ||

200
METHOD AND APPARATUS FOR MEASURING PERFORMANCE OF MULTI-SERVICE IN TUNNEL

CROSS-REFERENCE TO RELATED APPLICATIONS

This application is a Continuation of International Application No. PCT/CN2009/073659, filed on Sep. 1, 2009, which is hereby incorporated by reference in its entirety.

FIELD OF TECHNOLOGY

The present invention relates to the field of network communications technologies, and in particular to a method and an apparatus for measuring performance of multi-service in a tunnel.

BACKGROUND

In the field of communications, a tunnel is a transmission channel for bearing a service. One tunnel can bear multiple types of services (Class Type, CT), and different CTs are differentiated by using different priorities. Therefore, the tunnel can provide transmission services of different priorities for services that have different requirements of quality of service (Quality of Service, QOS), so that a network resource is fully utilized according to a user requirement.

An existing traffic engineering (Traffic Engineering, TE) tunnel, Internet protocol (Internet Protocol, IP) tunnel, label switched path (Label Switched Path, LSP) tunnel and so on can support simultaneous transmission of multiple services of different CTs (which may be referred to as different services), and a service class of a different service may be identified by using a priority identification field, where the priority identification field is generally used as a flag of a QOS service level.

With the constant development of a network and service, QOS of a service has become a hot topic of network research, and how to provide reliable and guaranteed service is a problem commonly concerned by operators. Performance parameters such as packet loss, delay, and variation, which are used as effective tools for measuring a service level of a service, are increasingly concerned by equipment suppliers and operators; however, performance parameters such as packet loss, delay, and variation still cannot be measured for different services transmitted in a same tunnel in the conventional technology.

SUMMARY

For the foregoing defect, an objective of an embodiment of the present invention is to provide a method and an apparatus for measuring performance of multi-service in a tunnel, so that a problem that performance for different services transmitted in a same tunnel still cannot be measured in the conventional technology may be solved.

An embodiment of the present invention provides a method for measuring performance of multi-service in a tunnel, where the method includes: receiving a measurement message corresponding to a service packet, where a priority of the measurement message is the same as a priority of the service packet corresponding to the measurement message, the measurement message includes a measurement parameter, and the measurement parameter includes at least one of the three: a packet loss measurement parameter, a delay measurement parameter, and a variation measurement parameter; and measuring performance of a service in the tunnel according to the measurement parameter in the measurement message.

An embodiment of the present invention further provides an apparatus for measuring performance of multi-service in a tunnel, where the apparatus includes: a measurement message receiving unit, configured to receive a measurement message corresponding to a service packet, where a priority of the measurement message is the same as a priority of the service packet corresponding to the measurement message, the measurement message includes a measurement parameter, and the measurement parameter includes at least one of the three: a packet loss measurement parameter, a delay measurement parameter, and a variation measurement parameter; and a service performance measuring unit, configured to measure performance of a service in the tunnel according to the measurement parameter in the measurement message.

According to the embodiments of the present invention, a priority of a measurement message is set to a priority of a corresponding service packet, and at least one parameter of the three: a packet loss measurement parameter, a delay measurement parameter, and a variation measurement parameter is added to the measurement message to measure performance of a service transmitted in a tunnel, so that performance measurement may be performed for different services transmitted in a same tunnel.

BRIEF DESCRIPTION OF THE DRAWINGS

The accompanying drawings described herein are provided for further understanding of the present invention, which are part of the application, but are not intended to limit the present invention. In the drawings:

FIG. 3 is a format diagram of an extended packet loss TLV according to Embodiment 2;

FIG. 4 is a format diagram of an extended packet loss and delay TLV according to Embodiment 2;

DETAILED DESCRIPTION

To make the objectives, technical solutions, and advantages of the present invention more comprehensible, the following describes the present invention in further detail with reference to specific embodiments and accompanying drawings. Herein, the exemplary embodiments of the present invention and their descriptions are merely provided for explaining the present invention, instead of limiting the present invention.

Embodiment 1

Figure 1:
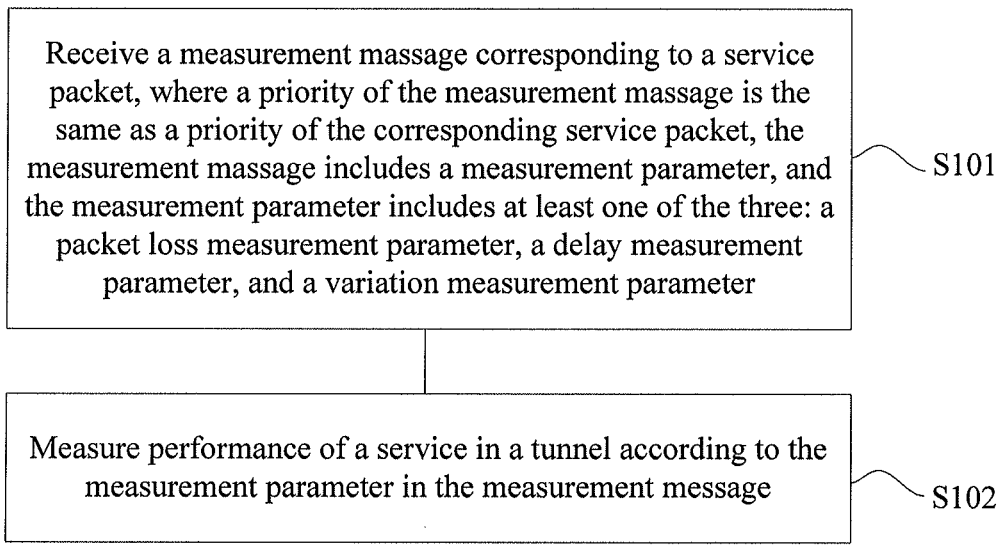
FIG. 1 is a flow chart of a method for measuring performance of multi-service in a tunnel according to Embodiment 1 of the present invention.

FIG. 1 is a flow chart of a method for measuring performance of multi-service in a tunnel according to Embodiment 1 of the present invention. The method includes:

S101: Receive a measurement message corresponding to a service packet, where a priority of the measurement message is the same as a priority of the service packet corresponding to the measurement message, the measurement message includes a measurement parameter, and the measurement parameter includes at least one of the three: a packet loss measurement parameter, a delay measurement parameter, and a variation measurement parameter. In this embodiment, the service packet may have multiple different types, which are differentiated by using priorities.

S102: Measure performance of a service in the tunnel according to the measurement parameter in the measurement message.

As an embodiment of the present invention, the measurement message described herein not only includes a one-way measurement message from a sending end to a receiving end, but also includes a measurement message sent by the sending end that carries request information and a measurement message that carries response information and is returned by the receiving end after receiving the measurement message that carries the request information. Corresponding to the foregoing two different sending manners of the measurement message, manners for measuring performance of a service in this embodiment are also different. One measuring manner is that performance of a service is to be measured at a remote end after the sending end sends a measurement message; and another measuring manner is that performance of a service is measured locally after the sending end sends a measurement message. In addition, the measurement message may be differentiated from the service packet by using a protocol number, a port number, or a label.

Meanwhile, because multiple services are transmitted in a same tunnel, in order to perform measurement and statistic collection on performance of different services, a problem to be solved is that various measurement messages need to be corresponding to the services to be measured. As an embodiment of the present invention, the foregoing problem is solved by setting a priority of the measurement message in the tunnel to a priority of a packet of a service that is measured by using the measurement message. In this way, it may be ensured that when a receiving end receives a measurement message, a type of service to be measured by using the measurement packet is identified, and it may also be ensured that a measurement result is scientific. Assuming that a measurement message of a certain service is transmitted with a priority of another service, performance of the service (for example, a delay or variation) that is finally measured may be inaccurate.

As an embodiment of the present invention, a measurement message includes at least one of the three: a packet loss measurement parameter, a delay measurement parameter, and a variation measurement parameter, so that packet loss and/or delay and/or variation performance of various types of services in a tunnel can be measured.

For example, packet loss measurement refers that comparing the number of preset-type packets of a certain service sent by a sending end with the number of the preset-type packets received by a receiving end to determine the packet loss of the service in a tunnel. It should be noted that, the preset-type packets described in this embodiment may include the following cases: all packets of a certain service, including all service packets of the service and corresponding measurement messages; or all service packets of a certain service; or a service packet with a specific feature of a certain service, for example, a service packet, the sending time of which falls within 12:00 to 24:00 on May 4, 2009, or a service packet with a specific mark.

Delay measurement refers that comparing a sending time stamp of a sending end carried in a measurement message with a receiving time stamp of a receiving end to obtain, by calculating a difference, the delay of a service in a tunnel corresponding to the measurement message. Variation measurement refers to a difference between two delay measurement results. Therefore, a variation measurement parameter is actually based on a delay measurement parameter. One-way delay measurement depends on clock synchronization, while a variation does not depend on the clock synchronization. Therefore, the variation may also be calculated in the case that a clock is not synchronized, while in this case, an error may occur during the one-way delay measurement.

According to this embodiment of the present invention, a priority of a measurement message is set to a priority of a corresponding service packet, and at least one parameter of the three: a packet loss measurement parameter, a delay measurement parameter, and a variation measurement parameter, is added to the measurement message to measure performance of a service transmitted in a tunnel, so that performance of different services transmitted in the same tunnel can be measured.

Embodiment 2

Figure 2:
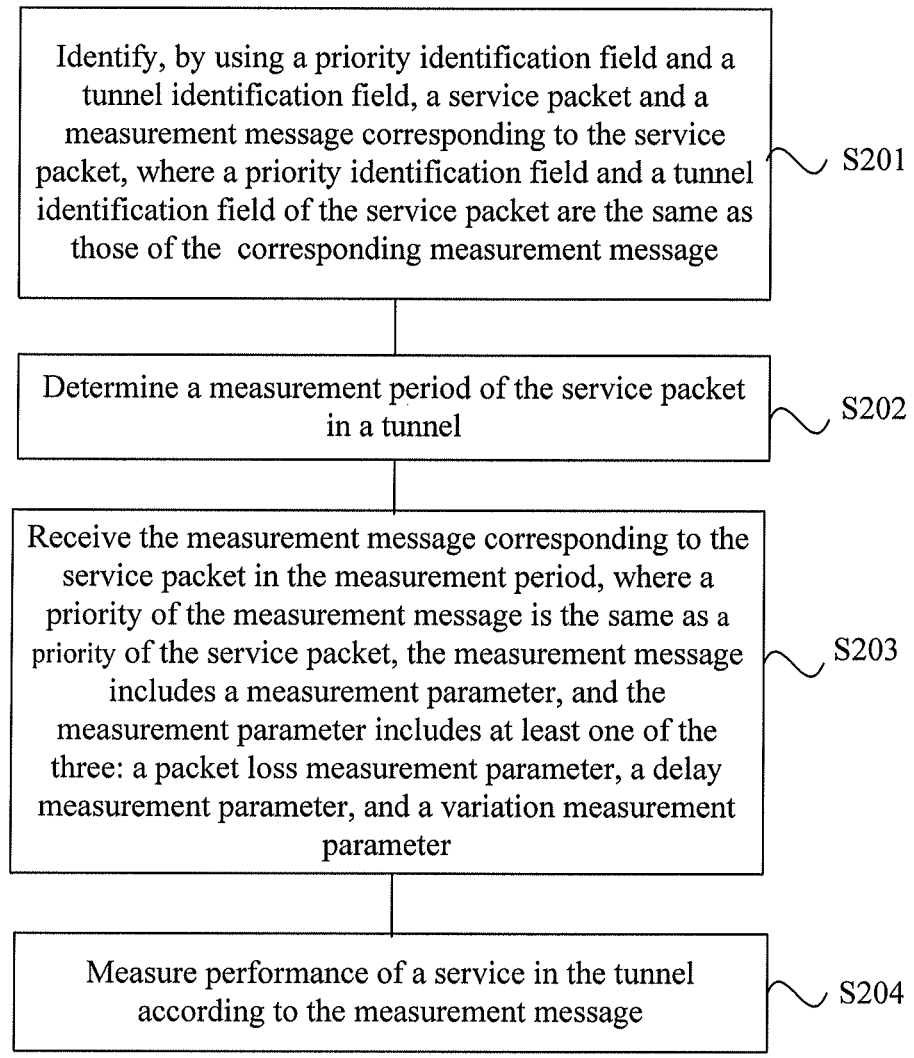
FIG. 2 is a flow chart of a method for measuring performance of multi-service in a tunnel according to Embodiment 2 of the present invention.

FIG. 2 is a flow chart of a method for measuring performance of multi-service in a tunnel according to Embodiment 2 of the present invention. The method includes:

S201: Identify, by using a priority identification field and a tunnel identification field, a service packet and a measurement message corresponding to the service packet, where a priority identification field and a tunnel identification field of the service packet are the same as those of the corresponding measurement message.

For different services transmitted in different tunnels, in this embodiment, a priority identification field and a tunnel identification field of a packet are used to identify various types of packets in a tunnel so as to differentiate service packets and their measurement messages in the different tunnels. The priority identification field, for example, may be a traffic class (Traffic Class, TC) field or a differentiated services code point (Differentiated services code point, DSCP) field, where the TC field is used for a multi-protocol label switching (Multi-Protocol Label Switching, MPLS) tunnel, and the DSCP field is used for an IP tunnel. In this embodiment, a TC field and a tunnel number Tunnel ID field in an MPLS TE tunnel are taken as an example for description. The TC field, which is an identification field for the traffic class in an MPLS label format, is generally used as a flag of a QOS level, and in this embodiment, also used as a flag of priorities of various types of service packets and measurement messages. The TC field may be used to differentiate different service packets and their measurement messages from others in a same TE tunnel. The tunnel ID field is a number of a TE tunnel, and this field may be combined with the TC field to differentiate service packets and their measurement messages in different TE tunnels.

As an embodiment of the present invention, if measurement is only performed on a service, the packet of which is transmitted in a same tunnel, the service packet and the measurement message corresponding to the service packet are identified by using only a priority identification field, where a priority identification field of the service packet is the same as that of the corresponding measurement message. In this way, different measurement messages transmitted in the same tunnel can be differentiated.

S202: Determine a measurement period of the service packet in a tunnel. The measurement period is a time period of measurement that is performed automatically by a measurement system on multi-service performance in the tunnel. In this embodiment, there may be two manners for setting the measurement period: One manner is that one end sends a negotiation message and receives acknowledgement information returned by a peer end to determine measurement periods of various types of services in the tunnel between the two ends; and the other manner is that measurement periods of various types of packets are defined in advance at the two ends. Compared with the second manner, the first negotiation manner is more flexible and convenient, and the first manner is described in detail in the following:

To achieve an objective of negotiating a measurement period, the negotiation message includes an extended type-length-value (Type-Length-Value, TLV) field, where the extended TLV carries information of a measurement period to be negotiated.

As an embodiment of the present invention, a negotiation message may be used to negotiate measurement periods for multiple types of service packets simultaneously, and may also be used to negotiate a measurement period for each type of service packet separately. The two cases are described separately in the following:

When a negotiation message is used to negotiate measurement periods for multiple types of service packets simultaneously, only one negotiation is needed to complete negotiation of a packet loss and/or delay measurement period for the two ends. Referring to FIG. 3, FIG. 3 is a format diagram of an extended packet loss TLV according to Embodiment 2. It can be seen from FIG. 3 that the extended packet loss TLV includes the following fields:

type (Type) field: identifying a type of the TLV, where the type field indicates that the TLV is a packet loss TLV (PL TLV) in this embodiment;

length (Length) field: identifying a length of the packet loss TLV;

tunnel number (Tunnel ID) field: identifying a tunnel to which the packet loss TLV belongs;

CT0-CT7: identifying CTs whose measurement periods are to be negotiated. Each type of service uses one identification bit, and one identification bit is one bit; and when a measurement period of a certain CT is to be negotiated for performance measurement, a corresponding CT identification bit is set to 1, otherwise, the corresponding CT identification bit is set to 0. In this embodiment, there are eight types of services in the tunnel. If measurement periods of CT0, CT4, and CT7 are to be negotiated, CT0-CT7 are set to 10001001 accordingly.

measurement period identification (Detect Time Identifier, DTI) field: This field is used to identify whether measurement periods of various CTs are consistent. If the DTI is set to 1, the measurement periods of the CTs are consistent; and if the DTI is set to 0, it indicates that the measurement periods of the CTs are not consistent (including a case of partial consistency).

reserved (Reserved) field: reserved for future use; and packet loss measurement period field of CTx: used to identify a packet loss measurement period of each CT. If the foregoing DTI field is 1, it is only one measurement period in this field; and if the foregoing DTI field is 0, measurement periods of corresponding CTs are set from CT0-CT7 sequentially in this field.

A sending end sends a negotiation message that carries the foregoing packet loss TLV to a receiving end. For example, a priority of the negotiation message may be set to be the highest, which may ensure that the negotiation message arrives at the receiving end preferentially. After receiving the negotiation message, the receiving end parses the negotiation message to obtain a CT whose measurement period is to be determined for packet loss performance measurement, and information about a packet loss measurement period corresponding to the CT; then, the receiving end returns acknowledgement information to the sending end. After the sending end receives the acknowledgement information, negotiation of the packet loss measurement period is completed.

In the same way, when a delay measurement period is to be negotiated, the negotiation message may carry a delay TLV, and is transmitted between the two ends to complete negotiation of the delay measurement period, where a structure of the delay TLV is the same as that of the packet loss TLV. As an embodiment of the present invention, a packet loss measurement period and a delay measurement period may also be negotiated by using one negotiation message. In this case, referring to FIG. 4, a delay measurement period field of CTx is placed following a packet loss measurement period field of CTx.

Figures 5, 6:
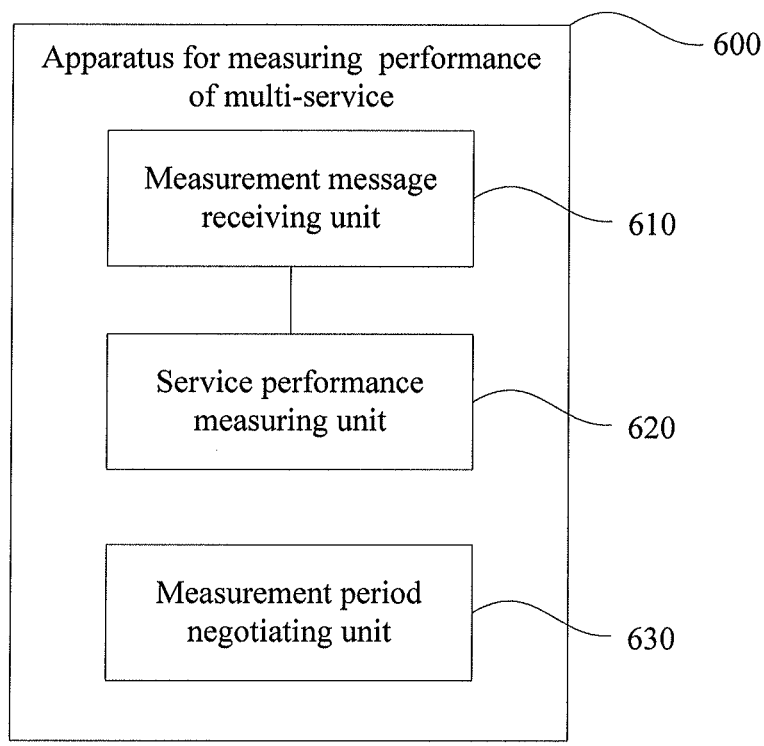
FIG. 5 is a format diagram of another extended packet loss and delay TLV according to Embodiment 2.
FIG. 6 is a schematic structural diagram of an apparatus for measuring performance of multi-service according to Embodiment 4 of the present invention.

When the negotiation message is used to negotiate a measurement period for each type of service packet separately, the two ends need to perform negotiation for multiple times to complete negotiation of packet loss and/or delay measurement periods. Referring to FIG. 5, FIG. 5 is a format diagram of another extended packet loss and delay TLV according to Embodiment 2. It can be seen from FIG. 5 that the extended packet loss and delay TLV includes the following fields:

type field: identifying a type of the TLV, where the type field indicates that the TLV is a performance measurement TLV (PM TLV) in this embodiment, that is, including two types of measurement periods: a packet loss measurement period and a delay measurement period;

length field: identifying a length of the TLV;

tunnel number field: identifying a tunnel to which the TLV belongs;

packet loss measurement period field: identifying a period of packet loss measurement of a CT; and delay measurement period field: identifying a period of delay measurement of the CT.

A sending end sends a negotiation message that carries the foregoing performance measurement TLV to a receiving end, and receives returned acknowledgement information so as to complete negotiation of a measurement period. It should be noted that, a measurement period is negotiated for each CT, but a CT to which a service to be measured belongs is not identified in the foregoing performance measurement TLV, and therefore a corresponding CT needs to be identified in a process for transmitting the negotiation message. In this embodiment, identification may also be implemented by adding a field for identifying the corresponding CT to the foregoing performance measurement TLV.

S203: Receive the measurement message in the measurement period, where the measurement message corresponds to the service packet, a priority of the measurement message is the same as a priority of the corresponding service packet, the measurement message includes a measurement parameter, and the measurement parameter includes at least one of the three: a packet loss measurement parameter, a delay measurement parameter, and a variation measurement parameter.

When the measurement period determined in step S202 ends, a sending end sends measurement messages corresponding to CTs, where the measurement messages carry packet loss measurement parameters, and/or delay measurement parameters, and/or variation measurement parameters. A performance measurement end receives these measurement messages, where these measurement messages, which are similar to those in Embodiment 1, not only include a one-way measurement message from the sending end to a receiving end, but also include a measurement message sent by the sending end that carries request information and a measurement message that carries response information and is returned by the receiving end after receiving the measurement message that carries the request information.

S204: Measure performance of various types of services in the tunnel according to the measurement message.

The performance measurement end differentiates various types of service packets and their measurement messages according to priority identification field and tunnel identification field, and then measures performance of various types of services, such as packet loss, delay, and variation, according to performance measurement parameters in the measurement messages or by combining performance measurement parameters in the measurement messages and a packet reception situation at the receiving end.

As an embodiment of the present invention, a measurement period may be determined to periodically perform performance measurement on various types of service packets; and a measurement period may also not be determined, a measurement message is sent as required, and a measuring end receives the measurement message to perform performance measurement; or a combination of the two are used.

According to this embodiment of the present invention, a priority of a measurement message is set to a priority of a corresponding service packet, and the measurement message and the service packet are identified by using a priority identification field and a tunnel identification field, and then at least one parameter of the three: a packet loss measurement parameter, a delay measurement parameter, and a variation measurement parameter in the measurement message is used to perform performance measurement on different services transmitted in a tunnel, so that a problem that performance of different services transmitted in multiple tunnels cannot be measured in the prior art may be solved.

Embodiment 3

In this embodiment, an extended bidirectional forwarding detection (Bidirectional Forwarding Detection, BFD) packet is used as a measurement message to further describe Embodiment 2.

BFD is a fast mechanism for detecting a fault, and can fast detect a connectivity of a link, but cannot measure a quality of the link. The inventor extends a BFD packet and adds a packet loss measurement TLV and/or delay measurement TLV to the BFD packet, so that a measurement end may measure a packet loss and/or delay situation and a variation situation of a service packet according to the packet loss measurement TLV and/or the delay measurement TLV.

Similarly to Embodiment 2, a priority of the extended BFD packet that is used as the measurement message is the same as a priority of corresponding service packet. For example, their priority identification fields may be the same. In addition, the extended BFD packet and corresponding service packet also have a same Tunnel ID field, so as to be differentiated from a packet in another tunnel.

The packet loss measurement TLV and the delay measurement TLV of the extended BFD packet are described in the following:

A value field of the packet loss measurement TLV includes transmitting count (TxPacketCounter_L), receiving count (RxPacketCounter_L), and returning count (TxPacketCounter_F). Transmitting count is the number of preset-type packets that have been sent when an extended BFD packet is sent. A manner for counting the number of the preset-type packets may be set, as required, to: counting all sent packets, or counting all sent data packets, or counting only packets with a specific feature, or counting only packets the sending time of which is specified. Receiving count is the number of preset-type packets that have been received when an extended BFD packet is received lately. Returning count is a transmitting count carried in an extended BFD packet that is received lately.

Transmitting count is used to calculate packet loss at near-end, Packet Loss [near-end], of a corresponding service packet, and receiving count and returning count are used to calculate packet loss at far-end, Packet Loss [far-end], of the corresponding service packet:

Packet Loss[near-end]=|TxPacketCounter_L[BFD1]−TxPacketCounter_L[BFD2]−|RxPacketCounterL[BFD1]−RxPacketCounterL[BFD2]|, where RxPacketCounterL is the number of packets received by a device when an extended BFD packet, BFD1 or BFD2, is received, where the device performs the calculation; and Packet Loss[far-end]=|TxPacketCounter_F[BFD1]−TxPacketCounter_F[BFD2]|−|RxPacketCounter_L[BFD1]−RxPacketCounter_L[BFD2]|.

If the near-end packet loss or far-end packet loss is not to be measured, a corresponding field may be set to 0.

A value field of the delay measurement TLV includes: transmitting time (TxTimeStamp_L), receiving time (RxTimeStamp_L), and returning time (TxTimeStamp_F). Transmitting time is local time when an extended BFD packet is sent; receiving time is local time when an extended BFD packet is received lately; and returning time is transmitting time carried in an extended BFD packet that is received lately.

Transmitting time is used to calculate a one-way delay, Packet Delay [one-way], of a corresponding service packet, and receiving time and returning time are used to calculate a two-way delay, Packet Delay [two-way], of the corresponding service packet:

Packet Delay [one-way] is a summation of a difference between a local time when the extended BFD packet is received and transmitting time (TxTimeStamp_L value) of the extended BFD packet and a time difference between a sending end and a receiving end. When a network supports strict clock synchronization, the time difference between the sending end and the receiving end is zero, and the one-way delay is equal to the difference between the local time when the extended BFD packet is received and the transmitting time of the extended BFD packet.

Packet Delay[two-way]=(RxTimea−TxTimeStamp_L)−(TxTimeStamp_F−RxTimeStamp_L), where RxTimea the local time when the extended BFD packet is received.

Formulas for calculating the foregoing near-end packet loss, far-end packet loss, one-way delay, and two-way delay have been disclosed as standards in Y.1731, which are not illustrated specifically herein.

After the one-way delay and the two-way delay of the corresponding service packet are obtained by using the foregoing formulas, a corresponding one-way delay variation and a two-way delay variation are also obtained. Specifically, a one-way delay variation is a difference between two one-way delay measurement results; and a two-way delay variation is a difference between two two-way delay measurement results.

If the extended BFD packet is used as the measurement message, negotiation of a measurement period may be completed in a process of establishing a BFD session at a sending end and a receiving end, which specifically includes:

The sending end sends a measurement period to be negotiated to the receiving end by sending a request (request) packet carrying an extended TLV. When measurement periods of multiple types of service packets are negotiated simultaneously, the extended TLV may adopt a format shown in FIG. 3; while when a measurement period of each type of service packet is negotiated separately, the extended TLV may adopt a format shown in FIG. 5.

After receiving the request packet, the receiving end obtains, through parsing, a measurement period of a service, performance of which is to be measured, and then returns the measurement period to acknowledge the request by returning a reply (reply) packet to the sending end.

The two ends complete negotiation of the measurement period.

According to this embodiment of the present invention, a priority of an extended BFD packet is set to a priority of a corresponding service packet, and the extended BFD packet and the service packet are identified by using a priority identification field and a tunnel identification field, and then performance measurement is performed by using a packet loss measurement TLV and/or a delay measurement TLV in the extended BFD packet for different services transmitted in multiple tunnels.

Embodiment 4

FIG. 6 is a schematic structural diagram of an apparatus 600 for measuring performance of multi-service according to Embodiment 4 of the present invention. The apparatus includes a measurement message receiving unit 610 and a service performance measuring unit 620, where the measurement message receiving unit 610 is connected to the service performance measuring unit 620.

The measurement message receiving unit 610 is configured to receive measurement messages corresponding to service packets. Priorities of these measurement messages are the same as those of corresponding service packets. For example, their priority identification fields may be the same. To implement performance measurement of corresponding services, these measurement messages include at least one parameter of: a packet loss parameter, a delay parameter, and a variation parameter.

To enable a measurement message to correspond to a service packet that is measured by using the measurement message, in this embodiment, various types of service packets and corresponding measurement messages are identified by using priority identification fields and Tunnel ID fields, where priority identification fields of the service packets are the same as those of the corresponding measurement messages and Tunnel ID fields of the service packets are the same as those of the corresponding measurement messages. Because different service packets in a same tunnel may be differentiated by using a priority identification field, service packets in different tunnels may also be differentiated by combining the priority identification field and a Tunnel ID field.

The service performance measuring unit 620 is configured to measure performance of corresponding services according to the measurement messages that are received by the measurement message receiving unit 610, that is, to calculate the performance of the corresponding services according to at least one parameter of: the packet loss parameter, the delay parameter, and the variation parameter in the measurement messages.

As an embodiment of the present invention, the packet loss parameter includes transmitting count (TxPacketCounter_L), receiving count, and returning count, where transmitting count may be used to calculate near-end packet loss, and receiving count and returning count may be combined to calculate far-end packet loss. The delay parameter includes transmitting time, receiving time, and returning time, where transmitting time may be used to calculate a one-way delay and a one-way delay variation, and transmitting time, receiving time, and returning time may be combined to calculate a two-way delay and a two-way delay variation.

It should be noted that, when the near-end packet loss is calculated, the apparatus 600 for measuring performance of multi-service further includes a received packet counter, configured to calculate the number of preset-type packets that have been received when the measurement messages are received; and when the one-way delay, the two-way delay, the one-way delay variation, and the two-way delay variation are calculated, the apparatus 600 for measuring performance of multi-service further includes a local timing storage unit, configured to storage local timing when the measurement messages are received.

As an embodiment of the present invention, the apparatus 600 for measuring performance of multi-service further includes a measurement period negotiating unit 630, configured to negotiate measurement periods of various types of service packets in a tunnel. For example, the measurement period negotiating unit 630 may send a negotiation message, and receive acknowledgement information returned by a peer end to determine measurement periods of various types of services in tunnels at two ends; and may also receive a negotiation message sent by the peer end, and return acknowledgement information to determine a measurement period. In this embodiment of the present invention, a measurement period may also be set for the apparatus 600 for measuring performance of multi-service.

As an embodiment of the present invention, a measurement message received by the measurement message receiving unit 610 is an extended bidirectional forwarding detection, BFD, packet. Using the BFD packet as the measurement message has been described in Embodiment 3, and details are not repeatedly described herein.

According to this embodiment of the present invention, priorities of measurement messages are set to priorities of corresponding service packets, and the measurement messages and the service packets are identified by using priority identification fields and tunnel identification fields, and then at least one parameter of the three: a packet loss measurement parameter, a delay measurement parameter, and a variation measurement parameter in the measurement messages is used to perform performance measurement for different services transmitted in multiple tunnels, so that a problem that performance measurement cannot be performed for different services transmitted in multiple tunnels in the prior art may be solved.

Persons of ordinary skill in the art may understand that all or part of the processes of the methods according to the embodiments may be implemented by a computer program instructing relevant hardware. The program may be stored in a computer readable storage medium. When the program is run, the processes of the methods according to the embodiments are performed. The storage medium may be a magnetic disk, an optical disk, a read-only memory (Read-Only Memory, ROM), or a random access memory (Random Access Memory, RAM), and the like.

The objectives, technical solutions, and benefits of the present invention are further described in detail in the foregoing specific embodiments. It should be understood that the foregoing descriptions are only specific embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A method for measuring performance of multi-service in a tunnel, comprising:
   receiving a measurement message corresponding to a service packet, wherein a priority of the measurement message is the same as a priority of the corresponding service packet, the measurement message comprises a measurement parameter, and the measurement parameter comprises at least one of the three: a packet loss measurement parameter, a delay measurement parameter, and a variation measurement parameter, wherein the measurement message is an extended bidirectional forwarding detection (BFD) packet, and the extended BFD packet comprises at least one of: a packet loss measurement TLV and a delay measurement TLV; and
   measuring performance of a service in a tunnel according to the measurement parameter in the measurement message;
   wherein before receiving the measurement message corresponding to the service packet, the method comprises:
   identifying the service packet by using a priority identification field and a tunnel identification field; and
   identifying the measurement message corresponding to the service packet by using a priority identification field and a tunnel identification field, wherein the priority identification field and the tunnel identification field of the service packet are the same as those of the corresponding measurement message;
   wherein measuring performance of the service in a tunnel according to the measurement message comprises:
   identifying, according to a priority identification field and a tunnel identification field of a received packet, a received service packet and an extended BFD packet corresponding to the service packet;
   at least one of: calculating a near-end packet loss rate of the service packet through transmitting count in the extended BFD packet and the number of preset-type packets that have been received by a receiving end; and calculating a one-way delay of the service packet through transmitting time in the extended BFD packet, local time when the extended BFD packet is received by the receiving end, and a time difference between a sending end and the receiving end.

2. The method according to claim 1, wherein receiving the measurement message corresponding to the service packet comprises at least one of:
   determining a measurement period of the service packet in the tunnel, and receiving the measurement message corresponding to the service packet in the measurement period; and
   receiving the measurement message sent as required corresponding to the service packet.

3. The method according to claim 2, wherein determining the measurement period of the service packet in the tunnel comprises one of:
   receiving acknowledgement information of a negotiation message, wherein the negotiation message is used to negotiate measurement periods for multiple types of service packets simultaneously or used to negotiate a measurement period for one type of service packet, and the negotiation message comprises an extended type-length-value (TLV); and
   defining a measurement period of the service packet before sending the measurement packet.

4. The method according to claim 3, wherein when the negotiation message is used to negotiate the measurement periods for the multiple types of service packets simultaneously, the value field of the extended TLV comprises:
   a service identification field for identifying a service, the performance of which is to be measured; and
   a measurement period of the service, the performance of which is to be measured.

5. The method according to claim 2, wherein the measurement period comprises at least one of the three: a packet loss measurement period, a delay measurement period, and a variation measurement period.

6. The method according to claim 1, wherein the measurement message is an extended bidirectional forwarding detection (BFD) packet, and the extended BFD packet comprises at least one of: a packet loss measurement TLV and a delay measurement TLV.

7. A method for measuring performance of multi-service in a tunnel comprising:
   receiving a measurement message corresponding to a service packet, wherein a priority of the measurement message is the same as a priority of the corresponding service packet, the measurement message comprises a measurement parameter, and the measurement parameter comprises at least one of the three: a packet loss measurement parameter, a delay measurement parameter, and a variation measurement parameter; and
   measuring performance of a service in a tunnel according to the measurement parameter in the measurement message,
   wherein before receiving the measurement message corresponding to the service packet, the method further comprises:
   identifying the service packet by using a priority identification field; and
   identifying the measurement message corresponding to the service packet by using a priority identification field, wherein the priority identification field of the service packet is the same as that of the corresponding measurement message;
   wherein the measurement message is an extended bidirectional forwarding detection (BFD) packet, and the extended BFD packet comprises at least one of: a packet loss measurement TLV and a delay measurement TLV;
   wherein measuring performance of the service in a tunnel according to the measurement message comprises:
   identifying, according to a priority identification field and a tunnel identification field of a received packet, a received service packet and an extended BFD packet corresponding to the service packet;
   calculating a near-end packet loss rate of the service packet through transmitting count in the extended BFD packet and the number of preset-type packets that have been received by a receiving end; and/or
   calculating a one-way delay of the service packet through transmitting time in the extended BFD packet, local time when the extended BFD packet is received by the receiving end, and a time difference between a sending end and the receiving end.

8. A method for measuring performance of multi-service in a tunnel, comprising:
   receiving a measurement message corresponding to a service packet, wherein a priority of the measurement message is the same as a priority of the corresponding service packet, the measurement message comprises a measurement parameter, and the measurement parameter comprises at least one of the three: a packet loss measurement parameter, a delay measurement parameter, and a variation measurement parameter, wherein the measurement message is an extended bidirectional forwarding detection (BFD) packet, and the extended BFD packet comprises at least one of: a packet loss measurement TLV and a delay measurement TLV; and measuring performance of a service in a tunnel according to the measurement parameter in the measurement message;

wherein before receiving the measurement message corresponding to the service packet, the method comprises:

identifying the service packet by using a priority identification field and a tunnel identification field; and identifying the measurement message corresponding to the service packet by using a priority identification field and a tunnel identification field, wherein the priority identification field and the tunnel identification field of the service packet are the same as those of the corresponding measurement message;

wherein measuring performance of a service in a tunnel according to the measurement message comprises:

identifying, according to a priority identification field and a tunnel identification field of a received packet, a received service packet and an extended BFD packet corresponding to the service packet;

calculating a far-end packet loss rate of the service packet through returning count and receiving count that are in the extended BFD packet; and/or calculating a two-way delay of the service packet through local time when the extended BFD packet is received by a receiving end, and transmitting time, returning time, and receiving time that are in the extended BFD packet.

9. The method according to claim 8, wherein receiving the measurement message corresponding to the service packet comprises at least one of:

determining a measurement period of the service packet in the tunnel, and receiving the measurement message corresponding to the service packet in the measurement period; and receiving the measurement message sent as required corresponding to the service packet.

10. The method according to claim 9, wherein determining the measurement period of the service packet in the tunnel comprises one of:

receiving acknowledgement information of a negotiation message, wherein the negotiation message is used to negotiate measurement periods for multiple types of service packets simultaneously or used to negotiate a measurement period for one type of service packet, and the negotiation message comprises an extended type-length-value (TLV); and defining a measurement period of the service packet before sending the measurement packet.

11. The method according to claim 10, wherein when the negotiation message is used to negotiate the measurement periods for the multiple types of service packets simultaneously, the value field of the extended TLV comprises:

a service identification field for identifying a service, the performance of which is to be measured; and a measurement period of the service, the performance of which is to be measured.

12. The method according to claim 9, wherein the measurement period comprises at least one of the three: a packet loss measurement period, a delay measurement period, and a variation measurement period.

13. A method for measuring performance of multi-service in a tunnel, comprising:

receiving a measurement message corresponding to a service packet, wherein a priority of the measurement message is the same as a priority of the corresponding service packet, the measurement message comprises a measurement parameter, and the measurement parameter comprises at least one of the three: a packet loss measurement parameter, a delay measurement parameter, and a variation measurement parameter; and measuring performance of a service in a tunnel according to the measurement parameter in the measurement message, wherein before receiving the measurement message corresponding to the service packet, the method further comprises:

identifying the service packet by using a priority identification field; and identifying the measurement message corresponding to the service packet by using a priority identification field, wherein the priority identification field of the service packet is the same as that of the corresponding measurement message;

wherein measuring performance of a service in a tunnel according to the measurement message comprises:

identifying, according to a priority identification field and a tunnel identification field of a received packet, a received service packet and an extended BFD packet corresponding to the service packet;

calculating a far-end packet loss rate of the service packet through returning count and receiving count that are in the extended BFD packet; and/or calculating a two-way delay of the service packet through local time when the extended BFD packet is received by a receiving end, and transmitting time, returning time, and receiving time that are in the extended BFD packet.

* * * * *